US010656452B2

(12) United States Patent
Bisson et al.

(10) Patent No.: US 10,656,452 B2
(45) Date of Patent: May 19, 2020

(54) IMAGE GENERATING DEVICE, HEAD-UP DISPLAY COMPRISING SUCH A DEVICE AND METHOD FOR MANUFACTURING AN IMAGE GENERATING DEVICE (71) Applicant: VALEO COMFORT AND DRIVING ASSISTANCE, Créteil (FR)

(72) Inventors: Jean-François Bisson, Créteil (FR); Delphine Le-Guyader, Créteil (FR); Renan Leon, Créteil (FR); Laurent Vivet, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 16/091,832

(22) PCT Filed: Apr. 7, 2017

(86) PCT No.: PCT/EP2017/058450
§ 371 (c)(1),
(2) Date: Mar. 5, 2019

(87) PCT Pub. No.: WO2017/174804
PCT Pub. Date: Oct. 12, 2017

(65) Prior Publication Data
US 2019/0196254 A1   Jun. 27, 2019

(30) Foreign Application Priority Data
Apr. 8, 2016  (FR) .................................. 16 53147

(51) Int. Cl.
G02F 1/1335 (2006.01)
G02F 1/1333 (2006.01)
(Continued)

(52) U.S. Cl.
CPC .......... *G02F 1/133385* (2013.01); *C01F 5/02* (2013.01); *C04B 37/02* (2013.01);
(Continued)

(58) Field of Classification Search
None
See application file for complete search history.

(56) References Cited

U.S. PATENT DOCUMENTS

2005/0195369 A1   9/2005  Shikita et al.

FOREIGN PATENT DOCUMENTS

DE   102014206586 A1   10/2015
EP       1724620 A1   11/2006
(Continued)

OTHER PUBLICATIONS

International Search Report in corresponding International Application No. PCT/EP2017/058450, dated May 12, 2017 (6 pages).

*Primary Examiner* — Richard H Kim
(74) *Attorney, Agent, or Firm* — Osha Liang LLP (57) ABSTRACT An image generating device comprises a light source producing a light beam and a screen (5) traversed by the light beam and designed to modify the light beam so as to form an image. The screen (5) comprises a transparent element (150) traversed by the light beam and designed to evacuate the heat generated at the level of the screen (5). Said transparent element (150) is made of sintered transparent ceramic. Also described are a head-up display comprising such a device, and a method for manufacturing an image generating device.

20 Claims, 2 Drawing Sheets (51) Int. Cl.
  *C04B 37/04*   (2006.01)
  *C04B 37/02*   (2006.01)
  *G02B 27/01*   (2006.01)
  *C01F 5/02*    (2006.01)

(52) U.S. Cl.
  CPC ............ *C04B 37/028* (2013.01); *C04B 37/04* (2013.01); *C04B 37/047* (2013.01); *G02B 27/01* (2013.01); *G02B 27/0149* (2013.01); *G02F 1/133308* (2013.01); *C01P 2006/32* (2013.01); *C01P 2006/60* (2013.01); *C04B 2237/34* (2013.01); *C04B 2237/366* (2013.01); *C04B 2237/40* (2013.01); *C04B 2237/704* (2013.01); *G02F 2001/133302* (2013.01); *G02F 2001/133331* (2013.01)

(56) References Cited

FOREIGN PATENT DOCUMENTS

| | | |
|---|---|---|
| JP | 2005313733 A | 11/2005 |
| JP | 2005 338160 A | 12/2005 |

IMAGE GENERATING DEVICE, HEAD-UP DISPLAY COMPRISING SUCH A DEVICE AND METHOD FOR MANUFACTURING AN IMAGE GENERATING DEVICE

TECHNICAL FIELD OF THE INVENTION

The present invention relates to the decrease of heating within screens, in particular in an image-generating device for a head-up display.

It more particularly relates to an image-generating device, to a head-up display comprising such a device and to a process for manufacturing an image-generating device.

TECHNOLOGICAL BACKGROUND

The principle of automotive head-up-up displays is to project images, in particular images that are useful for driving, directly into the field of view of a driver.

To do this, head-up displays in general comprise an image-generating device suitable for generating images and a device for projecting the generated images, which device is suitable for transmitting these images toward a semi-transparent plate placed in the field of view of the driver.

Most of the image-generating devices used at the present time comprise a light source that backlights a screen suitable for generating the images. This screen absorbs some of the light that backlights it, this causing thermal heating thereof.

However, the temperature of the screen is critical to the correct operation thereof, the latter running the risk of being damaged, or even being made defective, by a temperature that is too high. The heating of the screen may therefore decrease its lifetime and lead to its replacement.

It is therefore necessary to find solutions aiming to cool the screen, or to prevent heating thereof.

SUBJECT MATTER OF THE INVENTION

In this context, the present invention proposes an image-generating device (in particular for a head-up display) comprising a light source that produces a light beam and a screen that is passed through by the light beam and that is designed to modify the light beam so as to form an image, in which device the screen comprises a transparent element that is passed through by the light beam and that is arranged to remove the heat generated in the screen, characterized in that said transparent element is made of sintered transparent ceramic (i.e. obtained by sintering).

The use of a sintering process allows the transparent element to be produced at lower cost and is therefore particularly suitable for mass production of image-generating devices.

The aforementioned ceramic for example has a thermal conductivity higher than 10 W/mK and preferably even higher than 40 W/mK.

The aforementioned ceramic is for example a magnesium oxide. Specifically, the sintering process allowing a transparent ceramic made of magnesium oxide to be obtained is relatively simple. Magnesium oxide furthermore has a good thermal conductivity (typically comprised between 45 W/mK and 50 W/mK) and it is therefore particularly advantageous to make use thereof to form the thermally conductive element.

The transparent element may furthermore bear elements of polarizing the light beam, such as metal lines (forming a metal grid) that are able to polarize the light passing through the transparent element. The transparent element may then be used as a polarizer, as proposed in certain of the examples presented below.

The screen may comprise a metal cover. Provision is optionally made in this case for the transparent element to make thermal contact with the metal cover. The expression "thermal contact" is here understood to mean a direct or indirect contact allowing the transmission of heat. The transparent element will thus possibly make (physical) contact with the metal cover or be joined to the metal cover by means of an adhesive.

The heat generated within the screen may thus be transmitted by the transparent element to the metal cover, from which this heat is more easily removed.

A radiator intended to remove the heat may furthermore be formed or mounted on the metal cover.

Provision may be made for the metal cover to accommodate (in the interior of said metal cover) a liquid-crystal matrix array, and optionally furthermore a matrix array of color elements.

According to certain embodiments, the transparent element may make contact with at least one external face of the metal cover. Provision may then be made, in this case, for the transparent element either to make thermal contact with another element of the screen, for example a polarizer (here the entrance polarizer), thereby allowing most of the heat generated in this other element of the screen to be transmitted to the metal cover.

According to certain embodiments, the transparent element may be accommodated in the interior of the metal cover. The transparent element is then located at the heart of the screen and thus facilitates the removal of the heat generated within the screen.

The transparent element may in particular make contact with a transverse portion of the metal cover encircling a window formed in the metal cover. Thus, advantageously, the transverse portion of the metal cover is used to ensure both the (axial) retention of the constituent parts of the screen and the contact with the transparent element with a view to removal of the heat.

The transparent element for example possesses a transmittance higher than 50% (or even higher than 80%) in the visible. The transparent element may furthermore have an anti-reflection treatment in order to improve its transmittance.

The invention also proposes a head-up display comprising an image-generating device such as proposed above and an image-projecting device suitable for transmitting in the direction of a semi-transparent plate the images generated by the image-generating device.

The invention lastly proposes a process for manufacturing an image-generating device comprising a light source that produces a light beam and a screen that is passed through by the light beam and that is designed to modify the light beam so as to form an image, the process comprising the following steps:
- sintering a powder so as to obtain an element made of transparent ceramic;
- mounting said element on the screen so that this element is passed through by the light beam and removes the heat generated in the screen.

The optional features presented above in device terms may optionally be applied to such a method.

The invention also proposes an image-generating device comprising a light source that produces a light beam and a screen that is passed through by the light beam and that is designed to modify the light beam so as to form an image, in which device the screen comprises a transparent element (for example made of transparent ceramic) that is passed through by the light beam and that is arranged to remove the heat generated in the screen, characterized in that the screen comprises a metal cover and in that the transparent element is accommodated in the interior of the metal cover.

Various possible arrangements of the transparent element in the interior of the metal cover are proposed in the following description.

DETAILED DESCRIPTION OF ONE EXEMPLARY EMBODIMENT

The following description with reference to the appended drawings, which are provided as nonlimiting examples, will facilitate understanding of the invention and how it may be carried out.

The figures are not drawn to scale in order to allow the make-up of the screens presented below by way of example to be more clearly seen.

Figure 1:
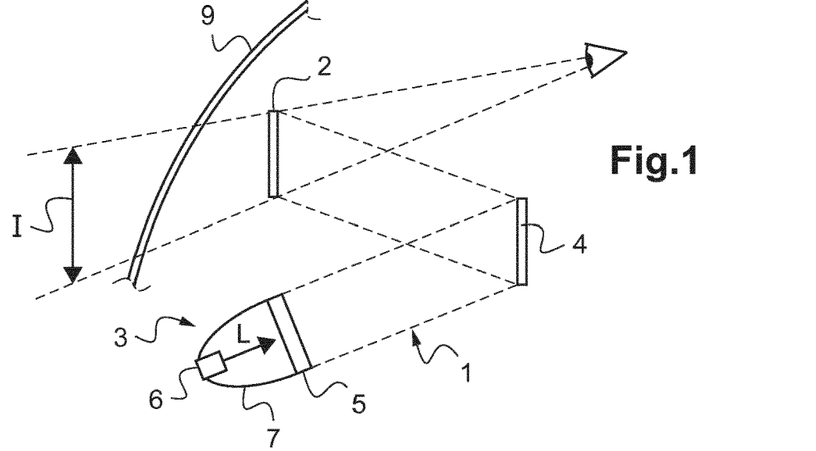
FIG. 1 schematically shows the main elements of a head-up display with which a vehicle is intended to be equipped.

FIG. 1 schematically shows the main elements of a head-up display 1 with which a vehicle, for example a motor vehicle, is intended to be equipped.

Such a display 1 is suitable for creating a virtual image I in the field of view of a driver of the vehicle, so that the driver is able to see this virtual image I and any information that it contains without having to divert his gaze.

To this end, the display 1 comprises a semi-transparent plate 2 that is placed in the field of view of the driver, an image-generating device 3 that is suitable for generating images and an image-projecting device 4 that is suitable for redirecting, in the direction of said semi-transparent plate 2, the images generated by the image-generating unit 3.

More precisely, the semi-transparent plate 2 is here a combiner 2, i.e. a semi-transparent plate dedicated to the head-up display 1.

Such a combiner 2 is here placed between the windshield 9 of the vehicle and the eyes of the driver.

As a variant, the semi-transparent plate could be combined with the windshield of the vehicle. In other words, in this variant, it is the windshield of the vehicle that performs the function of semi-transparent plate for the head-up display.

Moreover, here, the image-projecting device comprises a folding mirror 4 that is arranged so as to reflect the images generated by the image-generating device 3 in the direction of the semi-transparent plate 2. Here, said folding mirror is a plane mirror.

As a variant, the image-projecting device could comprise a plurality of mirrors and/or other optical elements such as a lens for example.

The image-generating device 3 comprises, for its part, at least one light source 6, a screen 5 that is backlit by this light source 6, and a reflector 7. Thus, in the figures, the transmission of the light from the light source 6 to the screen 5 has been schematically shown by the arrow L.

The light source 6 is here a light-emitting diode (LED) and the screen 5 is here a liquid-crystal display (LCD) for example a thin-film transistor (TFT) LCD. Example embodiments of such a screen are described below.

Figures 2, 3:
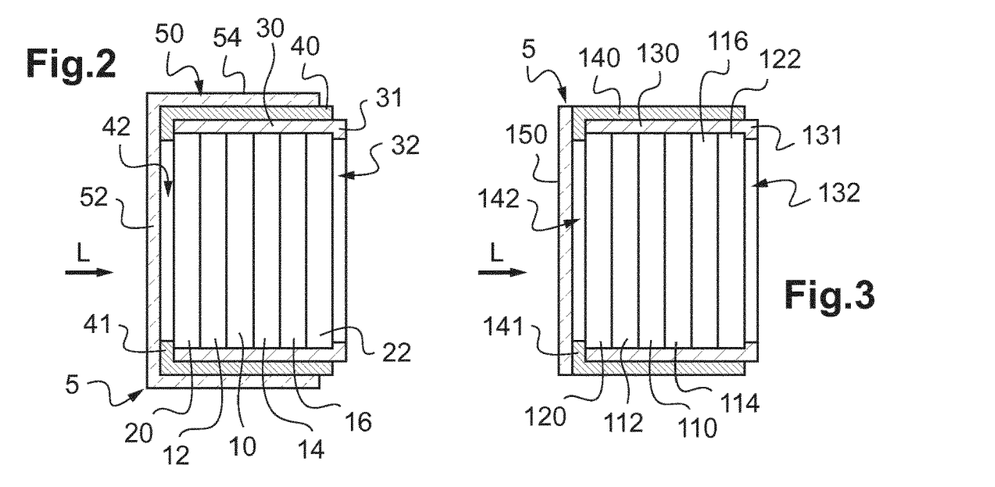
FIG. 2 shows a first example embodiment of a screen of a head-up display such as that of FIG. 1.
FIG. 3 shows a second example embodiment of such a screen.

FIG. 2 shows a first example embodiment of the screen 5.

In this first example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

an entrance polarizer 20;
a first glass sheet 12;
a liquid-crystal matrix array 10;
a second glass sheet 14;
a matrix array of color elements 16;
an exit polarizer 22.

The entrance polarizer 20 and the exit polarizer 22 are here filters that polarize by absorption (causing substantial heating of these polarizers 20, 22). The entrance polarizer 20 and the exit polarizer 22 respectively have a first axis and a second axis that are perpendicular to each other (in the context of the normally black or NB technology). (It will be recalled that the axis of a polarizer is the rectilinear polarization direction of the light beam after passage through the polarizer).

Thus, if no elements of the liquid-crystal matrix array 10 are active, the light beam between the entrance polarizer 20 and the exit polarizer 22 will be polarized along the first axis (axis of the entrance polarizer 20) and no light will therefore be emitted as output from the exit polarizer 22.

By suitably activating elements of the liquid-crystal matrix array 10 (by means of a control module that is not shown), the polarization of certain portions of the light beam is modified in the liquid-crystal matrix array 10 so that light is emitted as output from the exit polarizer 22 in regions corresponding to said portions of the light beam.

For each pixel of the screen 5, the matrix-array of color elements 16 comprises a plurality of color elements (here a red element, a green element and a blue element) through each of which it is possible to make an adjustable light intensity passed by suitably activating the corresponding element of the liquid-crystal matrix array 10, as indicated above.

Thus a color desired for each pixel is obtained by additive combination of the light passing through the various color elements of this pixel.

The aforementioned plate-shaped elements 10, 12, 14, 16, 20, 22 are mounted in a first cover 30 (sometimes called a bezel) that here is made of plastic. The first cover 30 for the most part extends around the edge faces of the aforementioned plate-shaped elements 10, 12, 14, 16, 20, 22 so as to retain these plate-shaped elements pressed against one another.

The first cover 30 here furthermore comprises a transverse portion 31 that makes contact with the exit face of the exit polarizer 22 so as to axially retain the aforementioned plate-shaped elements 10, 12, 14, 16, 20, 22. A window 32 is however formed in this transverse portion 31 of the first cover 30 in order to allow the light beam generated by the screen 5 to exit.

The first cover 30 is itself accommodated in a second cover 40 (also covered by the aforementioned term bezel). The second cover 40 is here a metal cover.

The second cover 40 extends around the first cover 30 over most of the length of the first cover 30 (in the direction of travel of the light). The second cover 40 furthermore comprises a transverse portion 41 that extends in line (and makes contact) with the circumferential end of the first cover 30 and of one portion of the entrance face of the entrance polarizer 20 so as to axially retain the aforementioned plate-shaped elements 10, 12, 14, 16, 20, 22. A window 42 is however formed in the transverse portion 41 of the second cover 40 in order to allow the light generated by the light source 6 to enter.

The screen 5 furthermore comprises a transparent element 50 made of sintered magnesia (or magnesium oxide, of formula MgO) and intended to remove heat, in particular the heat generated in the entrance polarizer 20.

To do this, the transparent element 50 is here placed in contact with the second cover 40. In the present embodiment, the transparent element 50 is arranged on the exterior of the second cover 40, and encircles the second cover 40 as will now be explained.

The transparent element 40 comprises a base 52 that extends transversely to the path of the light (and therefore in the present case parallel to the transverse portion 41 of the second cover 40), in line with the entirety of the entrance surface of the entrance polarizer 20.

The transparent element 40 here furthermore comprises sidewalls 54 that extend from peripheral regions of the base 52 and then make contact with the second cover 40 (more precisely the regions of the second cover 40 that encircle the plate-shaped elements 10, 12, 14, 16, 20, 22).

The transparent element 50 is optionally mounted adhesively bonded to the second cover 40.

The heat generated by the screen 5 (in particular in the entrance polarizer 20) is transmitted to the second cover 40 via its transverse portion 41 (in contact with the entrance polarizer 20), then to the transparent element 50.

Provision may furthermore be made for a radiator (not shown) mounted in contact with the second cover 40 and/or with the transparent element 50.

In order to further improve the heat removal, it is possible to make provision to fill the window 42 formed in the second cover 40 with transparent adhesive. Specifically, the heat will then be able to be removed from the entrance polarizer 20 to the transparent element 50 via the transparent adhesive.

As a variant, provision may be made for the base 52 of the transparent element 50 to comprise a protrusion that extends into the window 42 of the second cover 40 up to in contact with the entrance polarizer 20 so that heat will be able to be removed directly from the entrance polarizer 20 to the transparent element 50.

Magnesium oxide has a good thermal conductivity, of about 47 W/mK, this allowing heat to be effectively removed via the various measures envisioned above.

Provision may furthermore be made for the base 52 of the transparent element 50 to bear, for example on its face turned toward the light source, a set of metal lines forming a metal grid so that the transparent element 50 (equipped with this metal grid) forms a reflective polarizer (with a polarization axis identical to that of the entrance polarizer 20).

The metal lines are for example produced by vacuum deposition on the transparent element 50 (by condensation of metal vapor into a uniform film on the surface of the transparent element 50), then by means of a lithography process (removal of metal portions not protected by a resist in order to form the metal lines).

The transparent element 50 thus furthermore performs an (optical) polarization function.

Thus, light rays the polarization of which does not correspond to that of the transparent element 50 (nor therefore to that of the entrance polarizer 20) are reflected toward the interior of the image-forming device 3, in general toward the reflector 7, where they may be reflected again and possibly redirected toward the transparent element 50 with a polarization this time corresponding to that of the transparent element 50.

Other example embodiments envisionable for the screen 5 are described below. For the sake of conciseness, operating aspects that have already been presented above with reference to FIG. 2 will not be described again in the following description.

FIG. 3 shows a second example embodiment of such a screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

an entrance polarizer 120;
a first glass sheet 112;
a liquid-crystal matrix array 110;
a second glass sheet 114;
a matrix array of color elements 116;
an exit polarizer 122.

The aforementioned plate-shaped elements 110, 112, 114, 116, 120, 122 are mounted in a first cover 130 (sometimes called a bezel) that here is made of plastic. The first cover 130 for the most part extends around the edge faces of the aforementioned plate-shaped elements 110, 112, 114, 116, 120, 122 so as to retain these plate-shaped elements pressed against one another.

The first cover 130 here furthermore comprises a transverse portion 131 that makes contact with the exit face of the exit polarizer 122 so as to axially retain the aforementioned plate-shaped elements 110, 112, 114, 116, 120, 122. A window 132 is however formed in this transverse portion 131 of the first cover 130 in order to allow the light beam generated by the screen 5 to exit.

The first cover 130 is itself accommodated in a second cover 140 (also covered by the aforementioned term bezel). The second cover 140 is here a metal cover.

The second cover 140 extends around the first cover 130 over most of the length of the first cover 130 (in the direction of travel of the light). The second cover 140 furthermore comprises a transverse portion 141 that extends in line (and makes contact) with the circumferential end of the first cover 130 and of one portion of the entrance face of the entrance polarizer 120 so as to axially retain the aforementioned plate-shaped elements 110, 112, 114, 116, 120, 122. A window 142 is however formed in the transverse portion 141 of the second cover 140 in order to allow the light generated by the light source 6 to enter.

The screen 5 furthermore comprises a transparent plate-shaped element 150 made of sintered magnesia (or magnesium oxide, of formula MgO) and intended to remove heat, in particular the heat generated in the entrance polarizer 120.

To this end, the transparent element 150 is placed in contact with the second cover 140, here against the transverse portion 142 of the second cover 140. The transparent element 150 is for example adhesively bonded to the transverse portion 142 of the second cover 140.

In order to further improve the heat removal, it is possible to make provision to fill the window 142 formed in the second cover 140 with transparent adhesive. As a variant, provision may be made for the transparent element 150 to comprise a protrusion that extends into the window 142 of the second cover 140 up to in contact with the entrance polarizer 120 so that heat will be able to be removed directly from the entrance polarizer 120 to the transparent element 150.

The transparent element 150 may furthermore bear, for example on its face turned toward the light source 6, a set of metal lines forming a metal grid so that the transparent element 150 (equipped with this metal grid) forms a reflective polarizer (with a polarization axis identical to that of the entrance polarizer 120).

Figure 4:
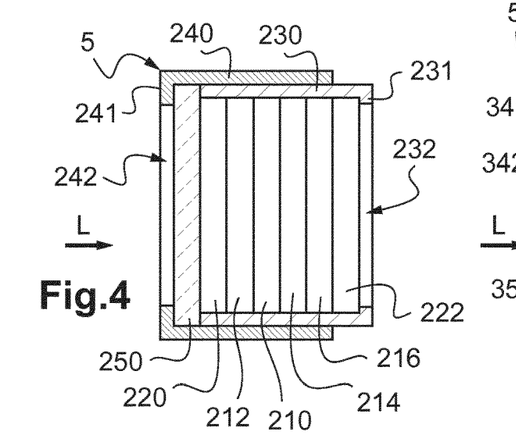
FIG. 4 shows a third example embodiment of such a screen.

FIG. 4 shows a third example embodiment of such a screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

a transparent element 250;
an entrance polarizer 220;
a first glass sheet 212;
a liquid-crystal matrix array 210;
a second glass sheet 214;
a matrix array of color elements 216;
an exit polarizer 222.

The transparent element 250 is made of sintered magnesia (or magnesium oxide, of formula MgO).

The transparent element 250 is thus placed in contact with the entrance polarizer 220 and may thus remove the heat generated within the screen 5, in particular the heat generated in the entrance polarizer 220.

The aforementioned plate-shaped elements 210, 212, 214, 216, 220, 222 (except the transparent element 250) are mounted in a first cover 230 (sometimes called a bezel) that here is made of plastic. The first cover 230 for the most part extends around the edge faces of the aforementioned plate-shaped elements 210, 212, 214, 216, 220, 222 (except here around the transparent element 250) so as to retain these plate-shaped elements pressed against one another.

The first cover 230 here furthermore comprises a transverse portion 231 that makes contact with the exit face of the exit polarizer 222 so as to axially retain the aforementioned plate-shaped elements 210, 212, 214, 216, 220, 222, 250. A window 232 is however formed in this transverse portion 231 of the first cover 230 in order to allow the light beam generated by the screen 5 to exit.

The first cover 230 and the transparent element 250 are accommodated in a second cover 240. The second cover 240 is here a metal cover.

The second cover 240 extends around the transparent element 250 and the first cover 130, over most of the length of the first cover 130 (in the direction of travel of the light). The second cover 240 furthermore comprises a transverse portion 241 that extends in line (and makes contact) with the peripheral portion of the transparent element 250 so as to axially retain the aforementioned plate-shaped elements 210, 212, 214, 216, 220, 222, 250. A window 242 is however formed in the transverse portion 241 of the second cover 240 (in line with the central portion of the transparent element 250) in order to allow the light generated by the light source 6 to enter into the screen 5 and through the transparent element 250.

The present embodiment also allows a particularly effective removal of the heat generated by the screen 5. Specifically, all of the entrance face of the entrance polarizer 220 makes contact with the transparent element 250, which makes contact with the second cover 240, to which heat is easily removed (by virtue of the good thermal conductivity of the transparent element 250 made of magnesium oxide and of the second metal cover 240). A radiator (not shown) may furthermore be formed or mounted on the second cover 240.

Moreover, provision may optionally be made to join the transparent element 250 and the entrance polarizer 220 by means of a transparent adhesive, this not calling into question the operation that has just been described.

The transparent element 250 may furthermore bear, for example on its face turned toward the light source 6, a set of metal lines forming a metal grid so that the transparent element 250 (equipped with this metal grid) forms a reflective polarizer (with a polarization axis identical to that of the entrance polarizer 220).

Figure 5:
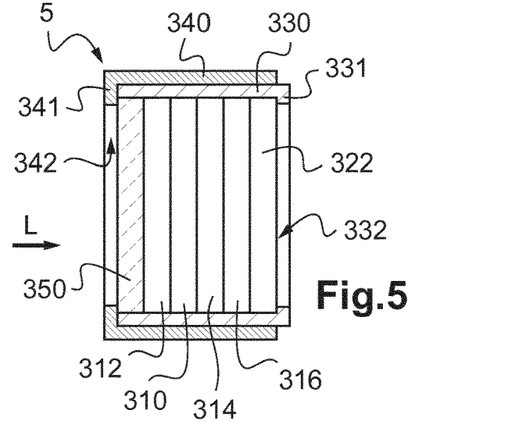
FIG. 5 shows a fourth example embodiment of such a screen.

FIG. 5 shows a fourth example embodiment of the screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

a transparent element 350 forming an entrance polarizer;
a first glass sheet 312;
a liquid-crystal matrix array 310;
a second glass sheet 314;
a matrix array of color elements 316;
an exit polarizer 322.

The transparent element 350 is made of sintered magnesia (or magnesium oxide, of formula MgO).

In order to perform the entrance-polarizer function (see in particular the description presented above with reference to FIG. 1 with regard to the operation of the screen 5), the transparent element 350 bears, for example on its face turned toward the light source 6, a set of metal lines forming a metal grid.

The transparent element 350 is thus placed in contact with the other plate-shaped elements and may remove the heat generated within the screen 5.

The aforementioned plate-shaped elements 310, 312, 314, 316, 322, 350 are mounted in a first cover 330 (sometimes called a bezel) that here is made of plastic. The first cover 330 for the most part extends around the edge faces of the aforementioned plate-shaped elements 310, 312, 314, 316, 322, 350 so as to retain these plate-shaped elements pressed against one another.

The first cover 330 here furthermore comprises a transverse portion 331 that makes contact with the exit face of the exit polarizer 322 so as to axially retain the aforementioned plate-shaped elements 310, 312, 314, 316, 322, 350. A window 332 is however formed in this transverse portion 331 of the first cover 330 in order to allow the light beam generated by the screen 5 to exit.

The first cover 330 is for its part accommodated in a second cover 340. The second cover 340 is here a metal cover.

The second cover 340 extends around the first cover 330 over most of the length of the first cover 330 (in the direction of travel of the light). The second cover 340 furthermore comprises a transverse portion 341 that extends in line (and makes contact) with the peripheral portion of the transparent element 350 so as to axially retain the aforementioned plate-shaped elements 310, 312, 314, 316, 322, 350. A window 342 is however formed in the transverse portion 341 of the second cover 340 (in line with the central portion of the transparent element 350) in order to allow the light generated by the light source 6 to enter into the screen 5 and through the transparent element 350.

In the present embodiment, the heat generated within the screen 5 is removed via the transparent element 350 to the second cover 340 (in particular by virtue of the contact between the peripheral portion of the transparent element 350 and the second cover 340, and of the good thermal conductivity of the transparent element 350 made of magnesium oxide). A radiator (not shown) may furthermore be formed or mounted on the second cover 340.

Figure 6:
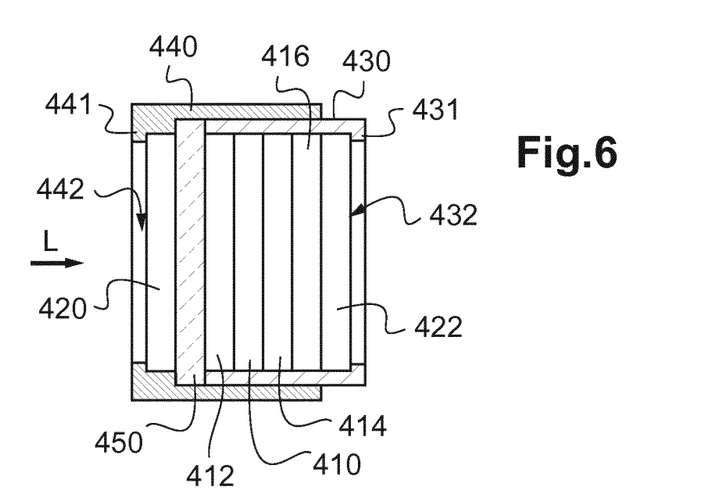
FIG. 6 shows a fifth example embodiment of such a screen.

FIG. 6 shows a fifth example embodiment of the screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

an entrance polarizer 420;
a transparent element 450;
a first glass sheet 412;
a liquid-crystal matrix array 410;
a second glass sheet 414;
a matrix array of color elements 416;
an exit polarizer 422.

The transparent element 450 is made of sintered magnesia (or magnesium oxide, of formula MgO).

The transparent element 450 is thus placed in contact with the other plate-shaped elements, here between the entrance polarizer 420 and the first glass sheet 412, and may remove the heat generated within the screen 5.

The aforementioned plate-shaped elements 410, 412, 414, 416, 420, 422, 450 are mounted in a first cover 430 (sometimes called a bezel) that here is made of plastic. The first cover 430 for the most part extends around some of the edge faces of the aforementioned plate-shaped elements 410, 412, 414, 416, 422 so as to retain these plate-shaped elements pressed against one another.

The first cover 430 here furthermore comprises a transverse portion 431 that makes contact with the exit face of the exit polarizer 422 so as to axially retain the aforementioned plate-shaped elements 410, 412, 414, 416, 420, 422, 450. A window 432 is however formed in this transverse portion 431 of the first cover 430 in order to allow the light beam generated by the screen 5 to exit.

The first cover 430 is for its part accommodated in a second cover 440. The second cover 440 is here a metal cover.

The second cover 440 extends around the first cover 430 over most of the length of the first cover 430 (in the direction of travel of the light). The second cover 440 furthermore comprises a transverse portion 441 that extends in line (and makes contact) with the peripheral portion of the entrance polarizer 420 so as to axially retain the aforementioned plate-shaped elements 410, 412, 414, 416, 420, 422, 450. A window 442 is however formed in the transverse portion 441 of the second cover 440 (in line with the central portion of the entrance polarizer 420) in order to allow the light generated by the light source 6 to enter into the screen 5 through the entrance polarizer 420.

The transparent element 450 has dimensions that are slightly larger than those of the other plate-shaped elements 410, 412, 414, 416, 422 so that the (edge face of the) transparent element 450 makes contact with the second cover 440.

Provision could thus be made for the entrance polarizer 420 to have dimensions identical to those of the transparent element 450 so as to be immobilized between the second cover 440 and the transparent element 450. As a variant, provision may be made for the first cover 430 to also extend to level with the entrance polarizer 420, as in the case of the sixth example shown in FIG. 7. In the example embodiment described here, as shown in FIG. 6, the second cover 440 is shaped to match, level with the entrance polarizer 420, the outside dimensions of the entrance polarizer 420.

In the present embodiment, the heat generated within the screen 5 is removed via the transparent element 450 to the second cover 440 (in particular by virtue of the contact between the edge face of the transparent element 450 and the second cover 440, and of the good thermal conductivity of the transparent element 450 made of magnesium oxide). A radiator (not shown) may furthermore be formed or mounted on the second cover 440.

Figure 7:
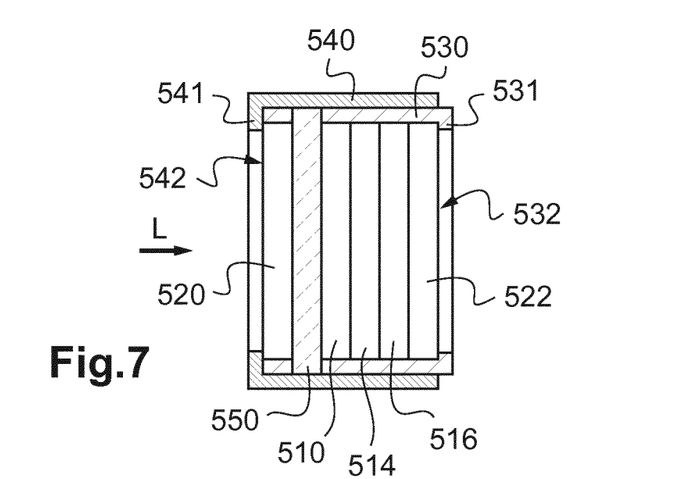
FIG. 7 shows a sixth example embodiment of such a screen.

FIG. 7 shows a sixth example embodiment of the screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

an entrance polarizer 520;
a transparent element 550 forming a liquid-crystal-retaining first glass sheet;
a liquid-crystal matrix array 510;
a second glass sheet 514;
a matrix array of color elements 516;
an exit polarizer 522.

The transparent element 550 is made of sintered magnesia (or magnesium oxide, of formula MgO).

The transparent element 550 is thus placed at the heart of the screen 5, here between the entrance polarizer 520 and the liquid-crystal matrix array 510, and may remove the heat generated within the screen 5.

The aforementioned plate-shaped elements 510, 514, 516, 520, 522, 550 are mounted in a first cover 530 (sometimes called a bezel) that here is made of plastic. The first cover 530 for the most part extends around the edge faces of the aforementioned plate-shaped elements 510, 514, 516, 520, 522 (except as regards the transparent element 550) so as to retain these plate-shaped elements pressed against one another.

The first cover 530 here furthermore comprises a transverse portion 531 that makes contact with the exit face of the exit polarizer 522 so as to axially retain the aforementioned plate-shaped elements 510, 514, 516, 520, 522, 550. A window 532 is however formed in this transverse portion 531 of the first cover 530 in order to allow the light beam generated by the screen 5 to exit.

The first cover 530 is for its part accommodated in a second cover 540. The second cover 540 is here a metal cover.

The second cover 540 extends around the first cover 530 over most of the length of the first cover 530 (in the direction of travel of the light). The second cover 540 furthermore comprises a transverse portion 541 that extends in line (and makes contact) with the peripheral portion of the entrance polarizer 520 so as to axially retain the aforementioned plate-shaped elements 510, 514, 516, 520, 522, 550. A window 542 is however formed in the transverse portion 541 of the second cover 540 (in line with the central portion of the entrance polarizer 520) in order to allow the light generated by the light source 6 to enter into the screen 5 through the entrance polarizer 520.

The transparent element 550 has, on at least one portion of its periphery, dimensions that are slightly larger than those of the other plate-shaped elements 510, 514, 516, 520, 522 so that (at least one portion of the edge face of) the transparent element 550 makes, through the apertures formed in the first cover 530, contact with the second cover 540.

In the present embodiment, the heat generated within the screen 5 is removed via the transparent element 550 to the second cover 540 (in particular by virtue of the contact between the edge face of the transparent element 550 and the second cover 540 on at least one portion of the edge face of the transparent element 550, and of the good thermal conductivity of the transparent element 550 made of magnesium oxide). A radiator (not shown) may furthermore be formed or mounted on the second cover 540.

Figure 8:
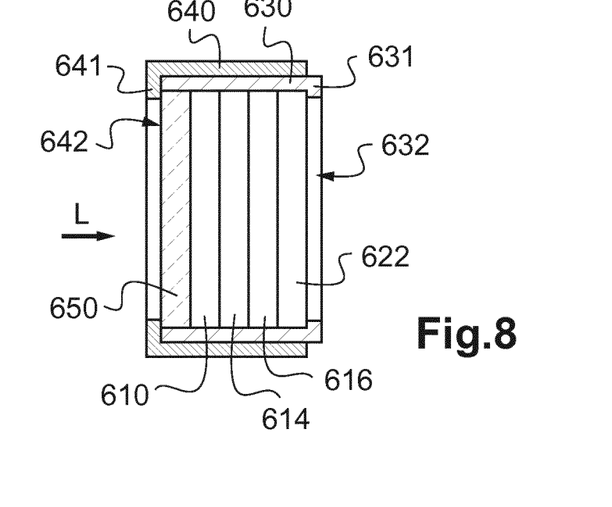
FIG. 8 shows a seventh example embodiment of such a screen.

FIG. 8 shows a seventh example embodiment of the screen 5.

In this example, the screen 5 comprises, in this order in the direction of travel of the light L (i.e. from the portion located on the side of the light source 6 to the side located toward the projecting device 4), the following plate-shaped elements (or plates) (each element making contact with the one or more neighboring elements):

a transparent element 650 forming an entrance polarizer and liquid-crystal-retaining glass sheet;

a liquid-crystal matrix array 610;

a glass sheet 614;

a matrix array of color elements 616;

an exit polarizer 622.

The transparent element 650 is made of sintered magnesia (or magnesium oxide, of formula MgO).

In order to perform the entrance-polarizer function (see in particular the description presented above with reference to FIG. 1 with regard to the operation of the screen 5), the transparent element 650 bears, for example on its face turned toward the light source 6, a set of metal lines forming a metal grid.

The transparent element 650 is thus placed in contact with the other plate-shaped elements and may remove the heat generated within the screen 5.

The aforementioned plate-shaped elements 610, 614, 616, 622, 650 are mounted in a first cover 630 (sometimes called a bezel) that here is made of plastic. The first cover 630 for the most part extends around the edge faces of the aforementioned plate-shaped elements 610, 614, 616, 622, 650 so as to retain these plate-shaped elements pressed against one another.

The first cover 630 here furthermore comprises a transverse portion 631 that makes contact with the exit face of the exit polarizer 622 so as to axially retain the aforementioned plate-shaped elements 610, 614, 616, 622, 650. A window 632 is however formed in this transverse portion 631 of the first cover 630 in order to allow the light beam generated by the screen 5 to exit.

The first cover 630 is for its part accommodated in a second cover 640. The second cover 640 is here a metal cover.

The second cover 640 extends around the first cover 630 over most of the length of the first cover 630 (in the direction of travel of the light). The second cover 640 furthermore comprises a transverse portion 641 that extends in line (and makes contact) with the peripheral portion of the transparent element 650 so as to axially retain the aforementioned plate-shaped elements 610, 614, 616, 622, 650. A window 642 is however formed in the transverse portion 641 of the second cover 640 (in line with the central portion of the transparent element 650) in order to allow the light generated by the light source 6 to enter into the screen 5 through the entrance polarizer 620.

In the present embodiment, the heat generated within the screen 5 is removed via the transparent element 650 to the second cover 640 (in particular by virtue of the contact between the peripheral portion of the transparent element 650 and the second cover 640, and of the good thermal conductivity of the transparent element 650 made of magnesium oxide). A radiator (not shown) may furthermore be formed or mounted on the second cover 640.

As indicated above, for all the embodiments that have just been described, the transparent element 50, 150, 250, 350, 450, 550, 650 is obtained by means of a sintering process.

Such a sintering process is for example a hot-isostatic-pressing (HIP) process or a spark-plasma-sintering (SPS) process.

It is proposed here to apply such a sintering process to a magnesium-oxide powder, this allowing a transparent ceramic able to form the aforementioned transparent element 50, 150, 250, 350, 450, 550, 650 to be easily obtained. The reader may for example refer to the article "*MgO—Transparent Ceramics with High Thermal Conductivity*", Fraunhofer IKTS Annual Report 2012/13 for more detail on such a process for obtaining the transparent element 50, 150, 250, 350, 450, 550, 650.

The transmittance of such a transparent element is higher than 85% (of about 86.5%).

However, it is possible to use, as a variant, other transparent ceramics, once again in sintered form, i.e. in a form obtained by sintering.

It is for example possible to use a transparent ceramic based on a simple oxide ($Al_2O_3$, $ZrO_2$, $Y_2O_3$, $Sc_2O_3$ or $Lu_2O_3$) or based on a complex oxide ($Y_3Al_5O_{12}$, $MgAl_2O_4$ or $ZNAl_2O_4$, or even $Lu_2TiO_3$, $Lu_2Zr_2O_7$, $Lu_3NbO_7$, $LaGdZr_2O_7$, $La_{9.33}Si_6O_{26}$, $Sr_2Y_8(SiO_4)_6O_2$, $Sr_3Al_2O_6$ or $BaAl_4O_7$) or even based on a non-oxide (AlON or AlN). In the each of the example embodiments presented above with reference to FIGS. 2 to 8, a transparent element formed from a transparent ceramic based on any one of the materials that have just been listed will possibly be used.

It will moreover be noted that the good thermal conductivity of magnesium oxide (typically comprised between 45 W/mK and 60 W/mK) allows a good removal of the heat to be obtained via the transparent element 50, 150, 250, 350, 450, 550, 650 even if the latter has a limited thickness, for example comprised between 0.5 mm and 3 mm. In the examples described here, it is proposed to use a transparent element having a thickness comprised between 0.5 mm and 1.5 mm, and more precisely between 0.8 mm and 1.2 mm (for example having a thickness of 1 mm).

Generally, it is for example proposed to use a transparent ceramic having a thermal conductivity higher than 10 W/mK (for example based on $Y_2O_3$, $Sc_2O_3$, $Lu_2O_3$, $Y_3Al_5O_{12}$, $MgAl_2O_4$, or AlON) or even a thermal conductivity higher than 40 W/mK (for example a transparent ceramic based on MgO, as already indicated, or based on aluminum nitride: AlN the thermal conductivity of which is 320 W/mK).

In the above description, the transparent element is located at (or in proximity to) the face through which the light L enters into the screen 5. Provision could however be made, as a variant or in addition, for a transparent element of the same type at (or in proximity to) the face through which the light exits, i.e. the face turned toward the redirecting mirror 4. It is thus possible to remove the generated heat via this exit face. In the case of use of a transparent element made of magnesium oxide, advantage is then furthermore taken of the low surface reflectance of the transparent element (surface reflectance 7% lower than with an element made of aluminum oxide for example), this limiting the reflexes present on the external face of the image-generating device.

In this context in particular (but also in the examples presented above), the transparent element may furthermore have an antireflection treatment in order to improve its transmittance.

The invention claimed is:

1. An image-generating device comprising:
   a light source that produces a light beam; and
   a screen that is passed through by the light beam, wherein the screen modifies the light beam so as to form an image, and the screen is mounted in a first cover accommodated in a second cover,
   wherein a first window is formed in a transverse portion of the second cover to allow the produced light beam to enter the screen,
   wherein the screen comprises a transparent element that is passed through by the light beam and that is arranged to remove the heat generated in the screen,
   wherein said transparent element is made of sintered transparent ceramic; and
   wherein a second window is formed in a transverse portion of the first cover to allow the modified light beam to exit the screen.

2. The image-generating device as claimed in claim 1, wherein said ceramic has a thermal conductivity higher than 40 W/mK.

3. The image-generating device as claimed in claim 1, wherein said ceramic is a magnesium oxide.

4. The image-generating device as claimed in claim 1, wherein said transparent element bears elements for polarizing the light beam.

5. The image-generating device as claimed in claim 1, wherein the second cover is a metal cover and wherein the transparent element makes thermal contact with the metal cover.

6. The image-generating device as claimed in claim 5, wherein the metal cover accommodates a liquid-crystal matrix array.

7. The image-generating device as claimed in claim 5, wherein the transparent element makes contact with at least one external face of the metal cover.

8. The image-generating device as claimed in claim 5, wherein the transparent element is accommodated in the interior of the metal cover.

9. The image-generating device as claimed in claim 5, wherein the transparent element makes contact with a transverse portion of the metal cover encircling a window formed in the metal cover.

10. A head-up display comprising:
    an image-generating device as claimed in claim 1; and
    an image-projecting device for transmitting in the direction of a semi-transparent plate the images generated by the image-generating device.

11. A process for manufacturing an image-generating device comprising a light source that produces a light beam and a screen that is passed through by the light beam and that is designed to modify the light beam so as to form an image, the process comprising:
    sintering a powder so as to obtain an element made of transparent ceramic;
    mounting said element on the screen so that this element is passed through by the light beam and removes the heat generated in the screen;
    mounting the screen in a first cover accommodated in a second cover;
    forming a first window in a transverse portion of the second cover to allow the produced light beam to enter the screen; and
    forming a second window in a transverse portion of the first cover to allow the modified light beam to exit the screen.

12. The process as claimed in claim 11, wherein the sintering is a hot-isostatic-pressing process or a spark-plasma-sintering process.

13. The process as claimed in claim 11, wherein the element made of transparent ceramic has a transmittance higher than 85 percent.

14. The process as claimed in claim 13, wherein the element made of transparent ceramic has a thickness between 0.5 mm to 1.5 mm.

15. The process as claimed in claim 11, further comprising providing an antireflection treatment on the element made of transparent ceramic.

16. An image-generating device comprising:
    a light source that produces a light beam; and
    a screen that is passed through by the light beam, wherein the screen modifies the light beam so as to form an image, and the screen is mounted in a first cover accommodated in a second cover,
    wherein a first window is formed in a transverse portion of the second cover to allow the produced light beam to enter the screen,
    wherein the screen comprises a transparent element that is passed through by the light beam and that is arranged to remove the heat generated in the screen,
    wherein the screen comprises a metal cover and the transparent element is accommodated in an interior of the metal cover, and
    wherein a second window is formed in a transverse portion of the first cover to allow the modified light beam to exit the screen.

17. The image-generating device as claimed in claim 16, wherein the screen comprises:
    an entrance polarizer;
    a first glass sheet;
    a liquid-crystal matrix array;
    a second glass sheet;
    a matrix array of color elements; and
    an exit polarizer.

18. The image-generating device as claimed in claim 17, wherein the entrance polarizer and the exit polarizer respectively have a first axis and a second axis perpendicular to each other.

19. The image-generating device as claimed in claim 17, wherein for each pixel of the screen, the matrix array of color elements comprises a plurality of color elements through each of which is configured to make an adjustable light intensity passed by activating a corresponding element of the liquid-crystal matrix array.

20. The image-generating device as claimed in claim 19, wherein a color of the pixel is obtained by the light beam passing through the plurality of color elements.

* * * * *